United States Patent [19]

Rood

[11] 4,184,311

[45] Jan. 22, 1980

[54] FIRE RETARDANT INSULATION

[76] Inventor: Leonard D. Rood, 5764 Flintlock La., Columbus, Ohio 43213

[21] Appl. No.: 868,677

[22] Filed: Jan. 11, 1978

Related U.S. Application Data

[63] Continuation-in-part of Ser. No. 781,156, Mar. 25, 1977, abandoned.

[51] Int. Cl.$^2$ ............... B65B 31/00; A62D 1/00; C09D 5/14; B02C 1/00
[52] U.S. Cl. ............... 53/434; 106/18.14; 106/18.16; 206/584; 220/429; 220/449; 220/452; 241/15; 252/2; 252/5; 252/7; 428/35; 428/537; 428/538; 428/921
[58] Field of Search ............... 252/2, 3, 5, 7; 53/124 E, 434, 124 B; 206/584; 241/15, 16; 428/35, 537, 538, 921; 52/406; 220/400, 429, 449, 452, 454; 106/15 FP

[56] References Cited

U.S. PATENT DOCUMENTS

| | | | |
|---|---|---|---|
| 1,901,999 | 3/1933 | Upson | 52/406 |
| 1,956,854 | 5/1934 | Clark | 52/406 |
| 2,028,253 | 1/1936 | Spafford | 52/406 |
| 2,299,908 | 10/1942 | Leash | 52/406 |
| 2,867,549 | 1/1959 | Outterson | 428/921 |
| 2,994,620 | 8/1961 | Franck et al. | 428/921 |
| 3,307,319 | 3/1967 | Christensen et al. | 53/434 |
| 3,398,019 | 8/1968 | Langguth et al. | 106/15 FP |
| 3,469,364 | 9/1969 | Bischoff | 53/434 |
| 3,606,726 | 9/1971 | Spertus et al. | 53/124 |
| 3,755,163 | 8/1973 | Bröll et al. | 252/7 |
| 3,940,516 | 2/1976 | Gierek et al. | 106/15 FP |
| 3,955,987 | 5/1976 | Schaar et al. | 252/7 |

Primary Examiner—William R. Dixon, Jr.
Attorney, Agent, or Firm—Frank H. Foster

[57] ABSTRACT

A flame retardant thermal insulation material comprising a dry, shredded cellulosic material, such as newsprint, which is coated with a dry phosphorous-containing, flame retardant composition. The composition is one which is capable of decomposing near the ignition temperature of the shredded paper, which is between 120 degrees and Celsius and 250 degrees Celsius and preferably includes a plurality of compounds which decompose at different temperatures spaced within this range to provide the stagewise release of combustion inhibiting agents. The composition can be a single compound such as calcium phosphate but preferably is a combination of similar compounds such as $(NH_4)_2HPO_4$, $CaH_4(PO_4)_2$, $CaHPO_4$ and triple super phosphate. Further, the phosphorous composition is preferably combined with urea. Elemental sulfur powder may be included with any of the previous compositions as a smoke retardant. The paper and flame retardant composition are maintained in the dry solid state during processing, application and use. The insulation is manufactured by shredding the paper and thoroughly mixing it with the finely ground, powdered flame retardant composition to intimately coat the paper with the flame retardant powder. The shredded, coated paper may be bagged for later use as poured or blown in insulation or it may be filled into elongated plastic envelopes to form insulative batting. Air may be evacuated from the bags or envelopes.

25 Claims, 1 Drawing Figure

FIRE RETARDANT INSULATION

BACKGROUND OF THE INVENTION

This application is a continuation in part of my copending application Ser. No. 781,156 filed Mar. 25, 1977 now abandoned.

This invention relates generally to flame retardant thermal insulation and more particularly relates to insulation made from dry shredded paper which is coated with a dry flame retardant chemical composition.

Thermal insulation of homes and buildings is not new. However, its importance has increased recently due to the expense and shortages of energy for heating and cooling. To be of value, the thermal insulation should have a high thermal resistance and be inexpensive, relatively non-flammable and, in some cases, easily installed in completed structures.

Until recently, fiberglass, rockwool or other mineral wools have been meeting these important criteria. Fiberglass is an energy intensive commodity though and its cost has begun to soar along with energy costs in general. Therefore, fiberglass is losing its economic advantage and alternatives are needed that exhibit the desirable characteristics of fiberglass while remaining affordable.

Flammability is also an extremely serious consideration when purchasing insulation. Flammability not only effects insurance premiums but also human life depends on the flammability characteristics of insulation. At the very least, insulation should not enhance the flammability of the structure as a whole and preferably, it will reduce its overall flammability.

Searchers for thermal insulation discovered that plain dry shredded paper has a desirable thermal resistance in addition to being inexpensive and easy to apply. There is a ready and plentiful source of paper from recycled newsprint which has an extremely small cost basis excluding transportation.

However, not only is finely shredded paper an excellent insulation, it is also a severe fire hazard. While unshredded paper has a low ignition temperature in comparison to the structure in which the insulation is needed, the ignition temperature of finely shredded paper is still lower.

The burning of cellulosic material proceeds in stages. As the temperature of the material rises the rate of oxidation increases and pyrolysis begins in which volatile, combustible gases are evolved which can form combustible mixtures with air. These gases may be evolved directly or from intermediate liquid or tarry products. If the exothermic oxidation is rapid enough that it will raise the temperature of adjacent material to a sufficiently high temperature, then adequate thermal feedback exists to propagate the fire. If insufficient heat is produced or enough is lost, then feedback will be inadequate.

With sufficient feedback, the evolved gas will eventually ignite into a visible flame. After the gases are driven off the solid residue which remains can undergo a different form of combustion by combining directly with oxygen as evidenced by glowing or afterglow. An effective fire retardant should be effective against both types of oxidation or burning.

When the prior art workers turned their attention to the need for a flame retardant for shredded paper insulation, they adopted a very simple system. They primarily used flame retardants which acted by giving off their water of hydration when heated so as to douse the fire before it was able to establish itself and reach the ignition temperature of the structural components.

An example of a well-known flame retardant that follows this type of mechanism is borax or boric acid such as described in a U.S. Pat. to Porz No. 2,470,641. This insulation uses pulverized boric acid on disintegrated recycled newsprint to effect an inexpensive, lightweight and flame retardant insulation. However, some of the flame retardancy exhibited by Borax-retarded insulation is believed due to moisture ordinarily contained in the shredded paper under normal humidity. Until recently, this insulation has shown only modest commercial success due to the fiberglass alternative and consequently the art has not advanced in almost 30 years. With the current energy situation changing the economics of insulation, there has been a renewed interest in shredded paper insulation.

There are a number of problems in the prior art. The first problem is that boric acid and other hydrated compounds lose their effectiveness as fire retardants when maintained at a high temperature in a dry atmosphere for a long period of time. The intense heat or low relative humidity that develop in the attic of a home cause the water of hydration in many of these compounds to be lost to the atmosphere. Since the mechanism by which these compounds operate is dependent on the water of hydration, the fire retardance is lost and the insulation is not much safer than plain, dry, shredded paper.

The standard tests applied to these materials do not expose this hazard because these tests are conducted in a humid environment and the tested materials are not previously exposed to a hot, dry environment for a long period of time.

While there are standards for the installation of shredded paper insulation, such insulation does get installed over heat sources such as recessed lights. Such heat sources can cause the loss of the water of hydration from conventional flame retardants and accelerate oxidation.

In some cases the flammable gases may be driven off at such a slow rate that a flame never occurs but after loss of the gases, a smouldering or afterglow combustion may begin. This could slowly propagate to wooden construction materials and then cause a fire. The present invention is effective against such smouldering.

The second problem with prior art fire retardant compositions is that corrosion of copper plumbing, wiring, aluminum ductwork and siding is caused by boric acid based systems. In portions of the structure that are not subject to hot, dry conditions, there is often condensation on a pipe or trapped atmospheric moisture that combines with boric acid crystals to form a corrosive boric acid solution. Neutralizers have been added to various compositions but corrosion has not been halted.

A third problem with boric acid based prior art retardant compositions is that boric acid is in short supply and subject to allocation restrictions. Since boric acid is by far the main flame retardant used by the paper insulation industry, a severe handicap has been placed on prospective entrants into this expanding market. Those manufacturers already in the market have received their allocations and can produce. It is difficult for a new entrant to get an allocation.

A fourth potential problem is the toxicity of borate compounds.

The current state of the shredded paper insulation art shows one way to use such insulation. In the current state of the art, a finished wall must serve as the container for the loose shredded paper insulation. The insulation is thus blown into the wall after construction is completed. This is an expensive and inefficient alternative to fiberglass batting when a new building is being constructed.

The packaging of shredded paper insulation conventionally consists of pouring or otherwise conveying the insulation into large paper sacks. Such sacks are bulky and occupy a considerable volume in a warehouse, a store and in transportation.

Finally, even when prior art fire retardant compositions were effective in preventing complete structural destruction, smoke damage could be extensive.

OBJECTS AND SUMMARY OF THE INVENTION

It is accordingly an object of the present invention to provide an improved shredded paper, flame retardant, thermal insulation material that does not depend on the water of hydration in its flame retardant coating for its flame retardant characteristics.

Another object of the present invention is to provide a flame retardant composition which will not gradually lose its effectiveness and will be effective at the ignition temperature of shredded paper insulation.

It is a further object of this invention to use a widely available material as flame retardant coatings that costs no more than boric acid now used in making shredded paper insulation.

A still further object of this invention is to provide a flame retardant shredded paper insulation material that will also inhibit smoke damage to a structure.

A still further object of this invention is to provide a method for making a flame retardant, shredded paper insulation material to be used as a loose-fill insulation material in completed structures.

A still further object of the invention is to provide a fire retardant composition which will provide a stagewise release of combustion inhibiting agents in the combustion temperature range of cellulosic materials.

A still further object of this invention is to provide a method for making a flame retardant, shredded paper insulative batting that can be installed during the construction of building walls and facings.

Further objects and features of the invention will be apparent from the following specification and claims when considered in connection with the accompanying drawing illustrating the preferred embodiments of the invention.

SUMMARY OF THE INVENTION

In summary, the invention is a flame retardant thermal insulation material that can be used with little corrosive effect in an insulatable space of a structure. The material is comprised of dry, shredded, cellulosic material that has a dry, powdered phosphorous-containing composition distributed over the surface of the insulation particles. The composition must be capable of decomposing in a temperature range of between substantially 120 degrees Celsius and substantially 250 degrees Celsius to evolve phosphoric acid. Dry powdered urea may advantageously be mixed in with the phosphorous-containing compositions. Powdered sulphur may also be included to inhibit smoke. The method for making the insulation material comprises shredding dry paper and then mixing the dry powdered phosphorous-containing composition and preferably also dry, powdered urea with the shredded paper to effect the coating of the surface of the paper with the fire retardant compositions. A batting is manufactured by enclosing the insulation in an elongated, batting-shaped envelope.

BRIEF DESCRIPTION OF THE DRAWING

The FIGURE is a view in perspective of an insulative batting emobdying the present invention which is operably attached to the studding of a building under construction.

In describing the embodiment of the invention illustrated in the drawing specific terminology will be resorted to for the sake of clarity, however, it is not intended to be limited to the specific terms so selected and it is to be understood that each specific term includes all technical equivalents which operate in a similar manner to accomplish a similar purpose.

DETAILED DESCRIPTION OF THE INVENTION

Figure 1:
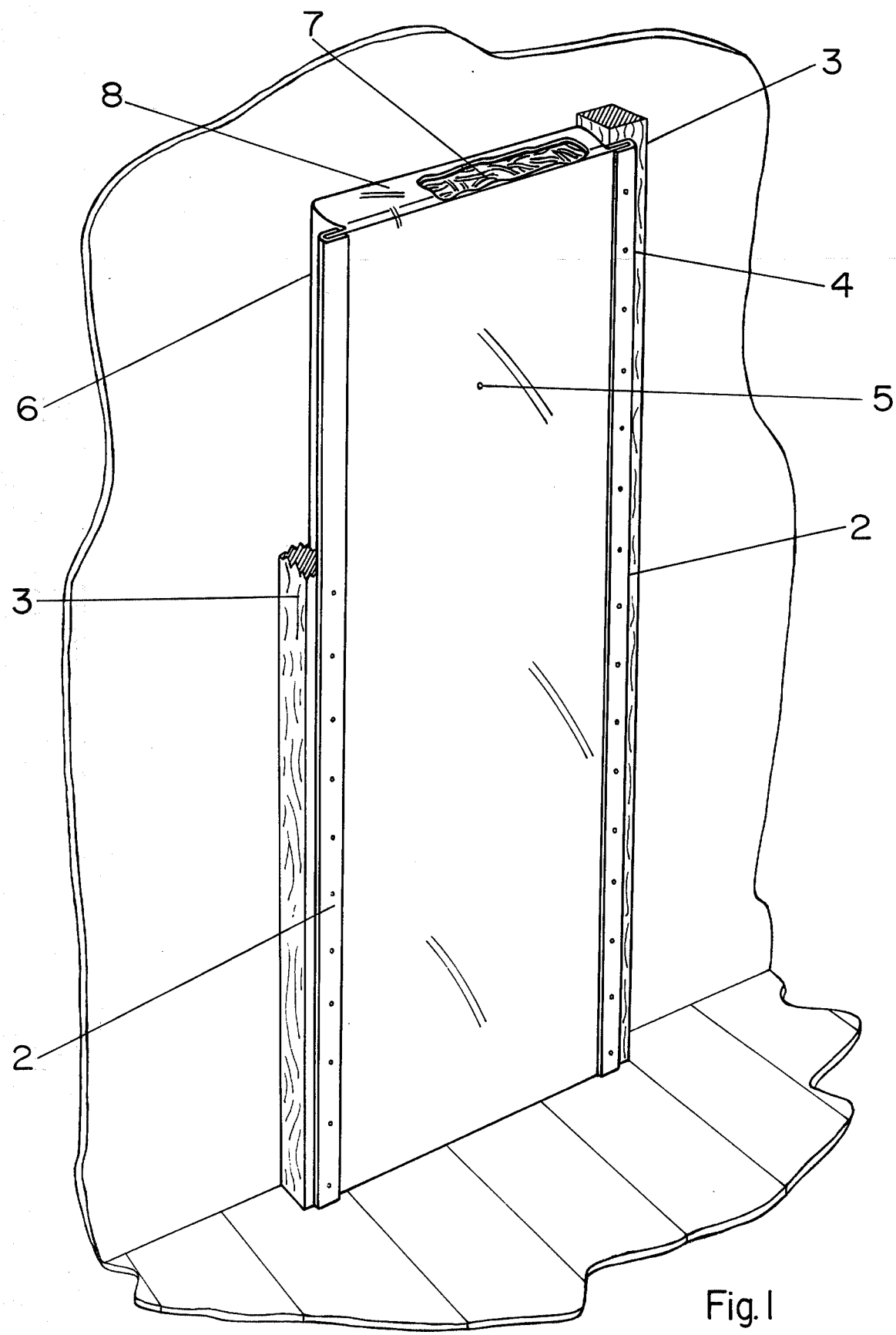

The conventional mechanism of providing flame retardancy to cellulosic fiber materials is based on a dehydration of the cellulose through a carbonium ion mechanism probably similar to the dehydration of some alcohols and glycols. The flame retardant agent may be present initially or it may be produced from its precursor at a temperature close to that of burning cellulose. The agent must not be volatile at 300° Celsius to 500° Celsius, must not burn readily, must be a "Lewis" acid or be capable of forming a Lewis acid at the temperature of burning cellulose.

While the ignition temperatures for cellulosic materials such as cloth are in the range of 300° Celsius to 500° Celsius, the ignition temperature of finely shredded paper ranges between substantially 120° Celsius and 250° Celsius.

An agent which decomposes or gives off its water of hydration below the ignition temperature range of shredded paper or other shredded cellulosic material will be ineffective because the normal attic temperatures and humidity to which it is exposed will cause its premature decomposition or dehydration. Such hydrated agents which are spaced from a spreading fire may be dehydrated by a nearby flame before the fire actually propagates to it. An agent which is activated above the ignition temperature range of the shredded paper will be insufficiently effective because ignition of the shredded paper can occur without it becoming active.

Therefore, compositions which are active to retard flame in the ignition temperature range of cloth are not active in the ignition temperature range of shredded paper.

Also, cloth-type cellulosic material requires the application of a fire retardant in a solution or wet form. The flame retardant compound is produced by reaction with the fibers of the cloth to provide a durable, insoluble precipitate that will remain effective after several washings. Since the shredded paper must be kept in a substantially dry condition during processing, and would become messy and lose much of its insulative properties by significant wetting, its flame retardant coating must be in a substantially dry condition when applied.

A phosphate or phosphite-containing composition, such as that used in the present invention, does not depend on the evolution of its water of hydration to effect its flame retardancy and is therefore an excellent replacement for the borax or boric acid systems currently in use. The phosphoric acid thus evolved changes the course of the reaction of the heated and decomposing cellulosic materials. In the presence of phosphoric acid, the production of flammable gasses from the thermal degradation of cellulose is greatly lessened. Further, there is suppression of the afterglow by diverting the oxidation of carbon to carbon monoxide which thereby produces insufficient energy to sustain the afterglow.

It is preferable to combine two or more of these phosphate or phosphite-containing compounds having somewhat different decomposition temperatures to produce an even more effective flame retardant system. In such a combination, if the compound that decomposes at the lower temperature should fail to sufficiently control the burgeoning fire, then as the temperature reaches the decomposition temperature of the second compound, that second compound would provide fire retardant activity.

One important feature of the present invention is that it provides for such a staging effect by utilizing a composition of materials which become active at different temperatures spaced within the decomposition temperature range of shredded cellulosic materials, i.e., 120° to 250° Celsius. In becoming active the compounds decompose, preferably endothermically, at various temperatures, to evolve combustion inhibiting agents.

The preferred phosphorous-containing materials are ammonium, calcium and sodium phosphates and phosphites and triple super phosphate. In particular, the best results have been obtained with the triple super phosphate combined with Ammonium orthophosphate, $(NH_4)_2 HPO_4$, and Monocalcium orthophosphate, $Ca(H_2PO_4)_2 H_2O$. Fire retarding of shredded paper was also obtained with $Na H_2PO_4.H_2O$, $Na_2HPO_4.2H_2O$, $Na_2HPO_4.12H_2O$, $Na_2H_2P_2O_7.6H_2O$, $Ca(H_2PO_4)_2$, $CaHPO_4.2H_2O$ and $CaH_2PO_4$.

Triple super phosphate has heretofore been known only as a fertilizer. Therefore its composition and some of its properties are readily available in the prior art literature. For example, such information is available in *Chemistry and Technology of Fertilizers* edited by Vincent Sauchelli, published by Reinhold Publishing Corporation, New York, American Chemical Society Monograph Series. Reference may also be made to *Phosphoric Acid, Phosphates and Phosphate Fertilizers* by William H. Waggaman, published in 1952 by the same publisher and of the same series.

Triple super phosphate has been characterized as essentially impure monocalcium phosphate in the Kirk-Othmer Encyclopedia of Chemical Technology, Volume 9, Second edition. I have found it particularly effective for retarding combustion in shredded cellulosic materials.

The triple super phosphate to my knowledge has not previously been used as a fire retardant. I have found it highly desirable because it becomes effective in the combustion temperature range of the shredded cellulosic material at temperatures which complement the temperatures in that range at which the other phosphorus containing compounds in the preferred formulation become active. Thus, it provides improved staging effect.

Additional substances may be incorporated into the phosphate or phosphite composition to produce additional advantageous effects.

Urea enhances the effectiveness of the primary flame retardant compound. It decomposes to yield ammonia which also retards the flame while the phosphoric acid retards the afterglow. The particular ratio in which nitrogen and phosphorous appear in the mixture is not critical although some compositions within a narrow range have been found to function more effectively.

Sulfur in its elemental form may be included in the fire retardant composition to perform a smoke suppressant function that can be of significant value in preventing smoke damage to a structure.

The decomposition temperature of the component parts of the flame retardant mixture, except for sulfur, should be at or near the ignition temperature of shredded paper in order to be effective. While the acceptable range of decomposition temperatures for these compounds ranges from 120° Celsius to 250° Celsius, the preferred range is from 130° Celsius to 210° Celsius. The flame retardant composition should be about 10% to 25% by weight of the shredded paper insulation and preferably 18% to 23%.

Different types of paper exhibit somewhat different ignition temperatures. With ordinary newsprint, such as that used in the Wall Street Journal, I have found a mixture of two parts urea and one part ammonium orthophosphate to be quite effective.

With a slightly more finished paper, such as commonly used in Sunday newspaper magazine sections, excellent fire retardancy was obtained with two parts ammonium orthophosphate and one part monocalcium orthophosphate.

One of the more effective mixtures comprises one part urea, one part ammonium orthophosphate and one part monocalcium orthophosphate.

Different mixing ratios can be selected to tailor the retardant to the burning characteristics of each type of insulation. Since the fire progresses in identifiable stages, the constituents are selected so that their decomposition temperatures are matched as nearly as practical at the temperatures of the different burning stages for the insulative material.

For example, for shredded papers with relatively lower ignition temperatures a mixture of urea and ammonium orthophosphate may be preferred, such as in the ratio of two to one respectively.

For higher temperatures one may use monocalcium orthophosphate and either ammonium orthophosphate or urea or all three. They may be mixed as two parts monocalcium orthophosphate and one part urea or ammonium orthophosphate.

It might be noted that use of monocalcium orthophosphate may require the addition of some neutralizing agent.

Other cellulosic materials may be treated with the flame retardants of the present invention to provide fire retardant insulation in accord with the present invention. For example, corn hulls or stalks, peanut shells or other inexpensive materials comprising the fibrous portions of many plants.

The term shredded as used in the specification and in the claims means shredded to the particle size which is recognized and known in the insulation industry as being sufficiently small for use as insulation. The size of the shredded particles are smaller than the size of excelsior or confetti. A rough standard used by the industry is that no more than one or two newsprint letters be visible on a shredded piece with substantial portions being shredded to a smaller size, although a few larger pieces will be tolerated.

When the cellulosic material is shredded to this extent, such as in a hammer mill, the total surface area of the particles is substantially increased and the ragged, fibrous nature of the edges of these particles becomes a substantial characteristic.

I have found that the flame retardant composition readily adheres to the paper or the shredded cellulosic material shredded in this manner. My theory of the scientific explanation of how this adherence occurs is that the particles are attached partly by the molecular attraction of the small powder particles to the shredded cellulosic material and partly are attached mechanically to the fibers of the shredded material. Thus, coating occurs in much the same manner as baking flour becomes coated on similar materials to which it may come into contact.

The term "dry" or "substantially dry" when used herein, for example in reference to dry chemicals such as dry powdered urea or dry, powdered triple super phosphate, is intended to have its common ordinary meaning to distinguish these materials from liquids such as solutions or from particulate materials having so much moisture that they become gummy, cake or clump.

The term dry does not mean absolutely devoid of water. For example, a material is still considered dry if it retains the characteristics of a powdered or particulate solid even though it retains some moisture such as water of crystalization of water absorbed from the atmosphere. Ordinarily the chemicals described herein have 1%-3% moisture but the moisture content may be higher. The dry shredded paper may ordinarily have 3% to 10% moisture and still be considered dry. The moisture content is dependent upon the relative humidity and may vary from time to time.

It is my theory that one reason in addition to the staging effect, for the substantially compound effectiveness of the present invention is that combustion is significantly moderated. It is believed moderated because the thermal energy released by the combustion reaction is in major part consumed by the endothermic decomposition reaction (i.e., the free energy of formation) of the fire retardant materials comprising the invention and the endothermic reaction of the decomposition products with the combustion products.

For example, the heat of combustion of cellulose is approximately 7000 BTU/pound. If a pound of such insulation includes 20% fire retardant in the form of two parts urea, three parts $Ca(H_2PO_4)_2$ and 1 part $(NH_4)_2HPO_4$ then the 80% cellulose will generate approximately 5600 BTU in a pound of insulation. However the decomposition of the fire retardant composition will consume approximately 4800 BTU. By comparison the boric acid system would consume approximately 1000 BTU.

One of the currently most preferred formulations is 3 parts triple super phosphate, 1 part diammonium phosphate, 2 parts urea, ¾ part calcium carbonate and trace amounts of an anticaking agent.

Another currently most preferred formulation is 4 parts triple super phosphate, 2 parts urea ½ part calcium carbonate and trace amounts of anticaking agent.

These formulations have been developed from many experimental formulations. In these experiments attempts were made to optimize the proportions of materials and it was discovered that sharp improvements in effectiveness occur for the ratios shown.

For example, I have discovered that the ratio of the phosphate compounds, such as the sum of the diammonium phosphate and the triple super phosphate, to the urea should be about 4:2. Ratios of 5:2 and 3:2 are not nearly as effective.

Furthermore, the ratios of Calcium Carbonate to triple super phosphate should be about 1:8.

The above ratios are observed in the above described most preferred formulations.

I am not certain of all the chemical and physical reactions which are occurring in the retardancy activity of the compositions of the present invention and these quantities and proportions have, in part, been experimentally determined. I suspect that these ratios may represent stoichiometric proportions.

It is my belief that the urea and diammonium phosphate become active in retarding combustion at the lower end of the temperature range described above and that the triple superphosphate becomes active at the highest ranges. I also suspect that the calcium carbonate may, in addition to its neutralizing activity, also have a further combustion retardant activity.

The flame retardant shredded paper insulation of the present invention is manufactured by first grinding the constituant chemicals into as fine a powder as possible. Grinding is necessitated by the course nature of the inexpensive phosphorous containing compounds that are preferably used. For example, mono-hydrogen calcium phosphate di-hydrate is merely one processing step away from phosphate rock. It is a widely used and inexpensive fertilizer. The large particle size of such crude fertilizer, however, requires grinding. As other components of the composition, such as urea and sulphur, are added it is necessary to get an intimate mixture of the various components of the composition in order to provide a flame retardant insulation material that has homogeneous flame retardant characteristics. Homogeneous mixing may be accomplished simultaneously with the grinding of the crude phosphorous containing compounds. Most current processing machinery for manufacturing shredded paper insulation includes grinding equipment along with the shredding an mixing apparatus.

At some point prior to, simultaneously with or subsequent to the grinding of the flame retardant materials, the paper itself is shredded into fine particles by means of a hammer mill or other shredding apparatus. Upon exiting from the shredding apparatus, the shredded paper is then delivered into a mixing bin, continuous in-line mixer or alternatively the shredding apparatus may also function as the mixing bin.

Once the shredded paper is in the mixing bin, the flame retardant chemical composition is added in a manner to effect a homogeneous coating of the entire surface area of the shredded paper. This coating may be accomplished in any of several ways. The chemical composition may be blown into the mixing bin using an air stream which carries the particulate chemical composition and effects agitation of the shredded paper in the bin thereby allowing complete coverage of the surface area of the shredded paper. The chemicals may be poured as a batch into the shredded paper in the mixing bin without using an air stream. The shredded paper and chemicals are then tumbled in the mixing bin. After a sufficient period of time elapses so that the shredded paper is completely coated, the insulation material may be separated from excess chemicals. Any excess may then be recycled and used in another coating step.

Continuous in-line mixers of the type commercially available may also be used and the fire retardant agent metered.

With the coating step completed, it is necessary to put the insulation material into containers in order to store, transport and use it. The material is thus transferred from the mixing bin through a auger type conveyer which moves the material to an opening at which a bag is attached. The manner in which the insulation material is bagged is dependent upon the particular application for which the material is intended.

The present invention provides for two applications for this shredded paper insulation. The first application, which up until the present invention has been the only application for all shredded paper insulation, is to use the material as a loose-fill insulation material is completed structures. For loose-fill applications, conventional bagging will suffice. In order to use the insulation material as loose-fill, it is merely necessary to open the bag and blow or pour the material into the spaces that need to be insulated. The phosphorous-containing compositions in the present invention do not corrode the internal metal elements in the walls. In fact, a phosphatizing reaction may occur in which protective films are formed on the metal surfaces.

The second application for the insulation material of the present invention is as insulative batting as shown in FIG. 1.

Insulative batting is useful in the same manner as fiberglass batting for insulating buildings under construction. The insulative batting 1 is formed at the bagging step by providing an elongated plastic envelope 6 into which the flame retardant shredded paper insulation material 7 is filled.

The plastic envelope 6 has two lateral flanges 2 which are used to attach the insulative batting to studding 3 by means of staples, tacks or nails 4. Air is drawn from the envelope 6 during manufacture through orifice 5 to facilitate transportation, storage and installation of the batting. Once operably positioned, the plastic envelope 6 is puntured allowing the reentry of air and causing the insulation material 7 and the plastic envelope 6 to expand tightly in the space between the studs 3. In addition to enveloping the shredded paper insulation material 7, the elongated plastic envelope 6 also presents a vapor barrier.

In a similar manner, an air impervious sack may be filled with the completed insulation and have air pumped from it. This will compress the sack and its contents into a package having a considerably smaller volume which will represent on the order of a 50% or more reduction in volume.

Subsequent opening or puncturing of the sack will initiate the expansion of the insulation back to its original density for use.

The following examples are given to further illustrate the present invention, but it should be understood that the invention is not to be limited in any way by the details described therein.

EXAMPLE 1

Shredded paper was produced by hand using a kitchen hand grater with diagonal projections spaced ⅛ inch apart. Starting with fine, powdered calcium orthophosphate $[Ca(H_2PO_4)_2]$ combined with urea in a proportion of 1.5 parts by weight of urea to 1 part by weight of the calcium orthophosphate, the chemical mixture was ground to a talcum powder consistency using a mortar and pestle with 100 circular strokes. Had the original phosphate-containing compound been of a greater particle size, more grinding would have been necessary. The chemical composition was added to the shredded paper by kneading the chemical and the shredded paper in an aluminum tray for three minutes until the powder was well distributed over the surface of the shredded paper. The coated shredded paper was then hand sifted in a one quart sifter by shaking to remove the excess powder. A mound of the coated shredded paper was formed in a 1 inch high, four-sided pyramidal shape. A book match was lit and held along one side of the shredded paper mound for 10 seconds and was then removed. The time for flame extinquishment was recorded as well as the time of punking if any punking was present.

In the first test, using material produced in the above manner, immediate extinquishment of the flame occurred with no subsequent punking. A second test using the same material showed a 4 second time of extinquishment of the flame with no subsequent punking.

A control experiment was run using commercially available shredded paper insulation coated with a borax/boric acid flame retardant composition. The mound was identically shaped and the ignition time was again 10 seconds. In the first test of the control a 7 second time of extinquishment of the flame was observed with no subsequent punking. In a second test using the same control material, a 5 second time of extinquishment was observed with no subsequent punking. The control insulation material was listed as complying with all major federal specifications for flame retardant paper insulation in addition to complying with the American Society for Testing and Materials standards for cellulosic loose-fill thermal insulation.

EXAMPLE TWO

The same procedure used to produce and test insulation material in Example 1 was followed except for the substitution of mono-hydrogen ammonium orthophosphate $[(NH_4)_2HPO_4]$ for the mono-calcium orthophosphate used in Example 1. In addition, two parts of urea were used to one part of the mono-hydrogen ammonium orthophosphate. A three to five second time of extinquishment of the flame was observed with no subsequent punking.

EXAMPLE THREE

The same procedure was followed in Examples 1 and 2, except that mono-hydrogen ammonium orthophosphate $[(NH_4)_2HPO_4]$ was used alone. The time of extinquishment of the flame was observed to be approximately six seconds with no subsequent punking. In this Example there was more flame initially than in Example 2. The quantity of flame was comparable to the control shredded paper insulation used in Example 1. This result suggests a synergistic effect between nitrogen-containing compounds and phosphorous-containing flame retardant compounds. The evolution of nitrogen-containing compounds such as ammonia tends to subdue the flame while phosphoric acid changes the course of the decomposition reaction of cellulose on heating.

EXAMPLE FOUR

An experiment was conducted to determine the change in flame retardancy of two commercially available shredded paper insulation materials and the insulation material of the present invention when heated in a dry atmosphere. One of the commercially available insulation materials was previously described and used as a control material in Example 1. The second insulation material was a commercial preparation believed to contain a three to two to one weight ratio of ammonium sulphate to borax to boric acid at a loading of approximately 20% by weight of chemical to paper. The shredded paper insulation of the present invention was prepared as described in Example 1 using a mixture of the urea and calcium orthophosphate mono-hydrate in a ratio of 1.5 parts by weight urea to 1 part by weight calcium orthophosphate mono-hydrate.

Approximately 5 grams of each of the three samples of shredded paper insulation were placed on an aluminum pan and heated in an oven to 200° F. for two hours. At the close of the two hour period, the three samples were removed from the oven and allowed to cool to room temperature for 10 minutes. Each of the three samples were then ignited by placing a flaming book match in the center of the 5 grams of insulation.

The commercial insulation material believed to contain a three to two to one weight ratio of ammonium sulphate to borax to boric acid was observed to flare badly thereby charring approximately 90% of the surface of the experimental mound. The commercial insulation that served as the control material in Example 1, flared, but not as badly as the first commercial insulation. Char was observed over approximately 75% of the surface of the 5 gram mound of this insulation material. The insulation material of the present invention used in this experiment burned only in the immediate vicinity of the flaming match. There was no flaring and only approximately 10% of the surface of the 5 gram mound was observed to have charred. As concerns the material of the present invention, its condition observed subsequent to heating it at 200° F. for two hours was substantially comparable to its condition before such heating was initiated.

EXAMPLE FIVE

A pan having dimensions $3'' \times 3'' \times 6''$ was three quarters filled with shredded paper insulation to which a retardant composition was applied consisting of one part urea, one part ammonium orthophosphate and one part mono-calcium orthophosphate.

A Weller soldering iron was heated and thrust into the center of the mass of insulation. After three or four minutes smoke was emitted and charring had occurred. When the iron was removed a layer of carbonaceous material had formed around the iron. Substantially all smouldering within the mass of insulation had ceased.

The same steps were taken with a shredded paper insulation with a commercial ammonium sulfate fire retardant. Smouldering afterglow propagated outwardly from the iron and had to be doused with water. There was no carbonaceous layer.

The same steps were then taken with shredded paper which was untreated with any retardant. This material was carbonized but afterglow continued.

EXAMPLE 6

Five grams of triple super phosphate were ground with a mortar and pestle into a fine powder. One gram of powdered super triple phosphate was mixed with four grams of shredded cellulose made from newspaper. The materials were mixed by shaking in a one pound coffee can with a plastic lid for 15 seconds. The mixture was then removed and three grams of the mixture were spread into a flattened pile. A burning book match was then placed upon the flattened pile.

The cellulose insulation ignited and produced a char. The flame progressed to about 80% of the surface and was extinguished.

EXAMPLE 7

The same procedures as described in Example 6 were carried out using powdered triple super phosphate and powdered urea. Two-thirds gram of powdered urea was intimately mixed with one-third gram of powdered triple super phosphate. One gram of this mixture was added to four grams of shredded paper and mixed as described above. Two grams of the mixture were spread in a flattened pile and then a burning book match was laid upon them.

The results were that the area charred was limited to that in the immediate area of the match flame. The match was extinguished after it was about half burned.

EXAMPLE 8

The same procedure was carried out as described in Example 7 except that the two-thirds gram of powdered urea and one-third gram of powdered triple super phosphate were not premixed. The powders were instead added separately to the mixing can and five grams of shredded paper insulation was also added to the can. After shaking the can for 15 seconds to mix the components, two grams of the material were again spread into a flat pile and a lighted book match was laid upon the pile.

The results were that the cellulose insulation and the fire retardant chemicals burned completely. Consequently the urea alone and the triple super phosphate alone in the above quantities do not provide adequate flame retardancy.

EXAMPLE 9

An experiment was conducted to determine the optimum calcium carbonate proportion in a formulation having two parts urea, one part diammonium phosphate and three parts triple super phosphate. In addition to these constituents, a first sample included one part calcium carbonate, a second sample included 1.5 parts calcium carbonate and a third sample included 0.75 parts calcium carbonate.

Each of these three samples were mixed with shredded paper insulation so that the total fire retardant chemical represented approximately 23% of the total weight. Portions of each of these samples were then exposed to heating to simulate the drying conditions in an attic. The samples were exposed to a 250 watt infrared heat lamp which was suspended 10 inches above the samples. A portion of each sample was not exposed to the heat lamp, a second portion of each sample was exposed for 20 minutes and a third portion of each sample was exposed for 30 minutes.

Each portion of each sample was then tested by laying a lighted match upon the sample. The results are then observed.

The unexposed portion of sample one gave excellent fire retardancy. However, the portion of sample one which was exposed to heating for 30 minutes was about 50% burned and therefore it gave poor fire retardancy.

The portion of sample two which was not heated gave excellent fire retardancy as did the portion heated for 20 minutes. However, the portion of sample two which was heated for 30 minutes was 20% consumed and therefore it gave fair to excellent fire retardancy properties.

The portion of sample three which was unheated and the portion which was heated for 20 minutes gave excellent fire retardancy. The portion heated for 30 minutes gave good to excellent fire retardancy. All three portions exhibited fire retardancy which was far superior to the fire retardancy exhibited by samples one and two.

Samples using still less calcium carbonate were not attempted because the proportions of sample three were believed to be the minimum necessary for effective chemical neutralization.

A further observation was made because the calcium carbonate used in sample one was wet agricultural lime. This material was found to give poor coverage of the cellulose fibers because it agglomerated into large particles.

EXAMPLE 10

Six grams of peanut shells taken from roasted peanuts were mixed in a blender for 1 minute with 1.8 grams of a fire retardant formulation which consisted of 2 parts urea, 1 part diammonium phosphate, 3 parts super triple super phosphate and 0.75 parts calcium carbonate. When a lighted match was placed upon the mixed material it was found that the material would not ignite. No combusition whatever occurred.

EXAMPLE 11

Six grams of dry peat moss was mixed in a blender for one minute with the identical formulation of Example 10. It was similarly found that the resulting mixture would not ignite when contacted with a lighted match. No combustion occurred.

EXAMPLE 12

Several fire retardant formulations were tested in order to determine an optimum ratio of triple super phosphate to urea. For all of the formulations, the ratio of triple super phosphate to calcium carbonate was maintained at a ratio of 4:1. The ratio of urea to diammonium phosphate was maintained at a ratio of 2:1.

Two tests were performed on shredded paper insulation samples each containing about 23% of a different formulation. In the first test, the cellulose insulation sample was heated for 5 minutes under the same heat lamp conditions described in Example 9. The sample was then removed from the heat lamp and a lighted wooden match was laid upon the sample. After 5 seconds the lighted match was removed. After removal of the match, the longest width and the longest length dimension of the charred surface area was recorded.

In the second test a lighted cigarette is inserted vertically into the cellulose insulation sample with the lighted end up. After 15 minutes the charred area is again measured in the same manner as in the 5 minute lamp test.

The first formulation provided a triple super phosphate to urea ratio of 1½:1. It consisted of 2 parts urea, 1 part diammonium phosphate, 3 parts triple super phosphate and ¾ part calcium carbonate. The lamp test produced a charred surface area 3 inches by 2½ inches.

The second formulation provided a triple super phosphate to urea ratio of 2:1. It consisted of 2 parts urea, 1 part diammonium phosphate, 4 parts triple super phosphate and 1 part calcium carbonate. The five minute lamp test produced a charred area 1 inch by 1 inch. The 15 minute cigarette test produced a charred area ½ inch by 1¼ inch.

The third formulation provided a triple super phosphate to urea ratio of 2.5:1. It consisted of 2 parts urea, 1 part diammonium phosphate, 5 parts triple super phosphate and 1.25 parts calcium carbonate. The five minute lamp test produced a charred area of 2 inches by 2 inches. The 15 minute cigarette test produced a charred area of 1 inch by 1 inch.

The fourth formulation provided a triple super phosphate to urea ratio of 3:1. It consisted of 2 parts urea, 1 part diammonium phosphate, 6 parts triple super phosphate and 1.5 parts calcium carbonate. The five minute lamp test produced a charred area of 3 inches by 2½ inches. The 15 minute cigarette test produced a charred area of 1¼ inches by 1¼ inches.

The fifth formulation provided a triple super phosphate to urea ratio of 3.5:1. It consisted of 2 parts urea, 1 part diammonium phosphate, 7 parts triple super phosphate and 1.75 parts calcium carbonate. The five minute lamp test produced a charred area of 3 inches by 2½ inches. The 15 minute cigarette test produced a charred area of 1¼ inches by 1¼ inches.

The results of Example 12 indicate that it appears that the optimum ratio of triple super phosphate to urea is substantially 2:1.

It is to be understood that while the detailed drawings and specific examples given describe preferred embodiments of the invention, they are for the purposes of illustration only, the the apparatus of the invention is not limited to precise details and conditions disclosed and that various changes may be made therein without departing from the spirit of the invention which is defined by the following claims.

I claim:

1. A method for preparing and packaging flame retardant thermal insulation comprising:
   (a) shredding dry paper;
   (b) feeding said dry paper into a hammer mill shredder;
   (c) depositing the shredded output of the hammer mill into a mixing bin;
   (d) mixing a dry, powdered, phosphorous-containing composition selected from the group consisting of phosphates and phosphites which decomposes in a temperature range of 120° C. to 250° C. to evolve phosphoric acid with said shreaded paper to effect the coating of said paper with said powder;
   (e) blowing said dry, powdered phosphorous-containing composition into said mixing bin to effect the intimate coating of the surface of said shredded paper with said composition;
   (f) transferring said coated shredded paper through an auger device to effect the enveloping of said coated shredded paper wherein the envelope used is an elongated plastic envelope and is capable of holding a vacuum;

(g) drawing a vacuum on said plastic envelope to effect compression of said insulation material; and (h) sealing said envelope while said envelope is under vacuum.

2. A flame retardant, thermal insulation material comprising:

(a) dry, shredded, cellulosic material; and (b) a substantially dry, powdered, flame retardant composition which includes a plurality of compounds which are phosphorous containing compounds selected from the group consisting of phosphates and phosphites which decompose at a plurality of different temperatures spaced within a temperature range of substantially 120° Celsius to 250° C. to evolve phosphoric acid and other agents which retard the exothermic oxidation of said cellulosic material and decomposition products thereof, said composition being distributed on the surface of said shredded material.

3. An insulation according to claim 2 wherein said flame resistant composition includes calcium phosphate.

4. An insulation according to claim 3 wherein said composition further comprises monocalcium phosphate and dicalcium phosphate.

5. An insulation according to claim 2 wherein said phosphorous containing composition comprises diammonium phosphate and calcium phosphate and wherein said retardant further comprises dry powdered urea.

6. An insulation retardant according to claim 5 wherein said composition further comprises calcium carbonate.

7. An insulation according to claim 2 wherein said flame retardant composition includes dry powered triple super phosphate.

8. An insulation according to claim 7 wherein said retardant further comprises dry powdered urea.

9. An insulation according to claim 8 wherein said phosphorous containing composition further comprises dry powdered diammonium phosphate.

10. An insulation according to claim 9 wherein said composition further comprises calcium carbonate.

11. An insulation material according to claim 2 wherein said phosphorous-containing flame retardant composition comprises one or more phosphite compounds selected from the group consisting of $Na_2HPO_3.5H_2O$, $NH_4H_2PO_2$, and $NH_4H_2PO_3$.

12. An insulation material according to claim 2 wherein said flame retardant further comprises elemental sulfur as a smoke suppressant.

13. An insulation material according to claim 2 wherein said phosphorous containing flame retardant composition includes monosodium phosphate.

14. An insulation material according to claim 2 wherein said phosphorous containing flame retardant composition includes disodium phosphate.

15. A flame retardant for a dry, shredded, cellulosic, thermal insulation material, said retardant comprising a substantially dry, powdered, phosphorous-containing, flame retardant composition which decomposes to evolve phosphoric acid substantially at the temperatures at which the insulation material has sufficient thermal feedback to sustain its rapid oxidation wherein said composition comprises calcium phosphate or dry powered triple super phosphate or both and at least one other flame retardant compound which decomposes at a temperature different from said phosphate.

16. A flame retardant according to claim 15 wherein said composition comprises monocalcium phosphate and dicalcium phosphate.

17. A flame retardant according to claim 16 wherein said composition further comprises calcium carbonate.

18. A flame retardant according to claim 15 wherein said retardant further comprises dry powered urea.

19. A flame retardant according to claim 18 further comprising calcium carbonate.

20. A flame retardant for a dry, shredded, cellulosic, thermal insulation material, said retardant comprising a substantially dry, powdered, phosphorous-containing, flame retardant composition which decomposes to evolve phosphoric acid substantially at the temperature at which the insulation material has sufficient thermal feedback to sustain its rapid oxidation wherein said phosphorous containing composition comprises diammonium phosphate and calcium phosphate and wherein said retardant further comprises dry powdered urea.

21. A flame retardant for a dry, shredded, cellulosic, thermal insulation material, said retardant comprising a substantially dry, powdered, phosphorous-containing, flame retardant composition which decomposes to evolve phosphoric acid substantially at the temperature at which the insulation material has sufficient thermal feedback to sustain its rapid oxidation wherein said retardant comprises substantially 2 parts urea, 1 part diammonium phosphate, 3 parts triple super phosphate and a neutralizing agent.

22. A flame retardant according to claim 21 wherein said neutralizing agent is substantially $\frac{3}{4}$ part calcium carbonate.

23. A flame retardant for a dry, shredded, cellulosic, thermal insulation material, said retardant comprising a substantially dry, powdered, phosphorous-containing, flame retardant composition which decomposes to evolve phosphoric acid substantially at the temperature at which the insulation material has sufficient thermal feedback to sustain its rapid oxidation wherein said retardant comprises substantially 2 parts urea, 4 parts triple superphosphate and a neutralizing agent.

24. A fire retardant according to claim 23 where said neutralizing agent is substantially $\frac{1}{2}$ part calcium carbonate.

25. A flame retardant for a dry, shredded, cellulosic thermal insulation material, said retardant comprising a substantially dry, powdered, phosphorous-containing, flame retardant composition which decomposes to evolve phosphoric acid substantially at the temperature at which the insulation material has sufficient thermal feedback to sustain its rapid oxidation wherein said retardant includes urea, calcium carbonate and triple super phosphate and wherein the ratio of urea to the total phosphate compounds is essentially 1:2 and the ratio of calcium carbonate to triple super phosphate is essentially 1:8.

* * * * *